US005971207A

United States Patent [19]

McDonough et al.

[11] Patent Number: 5,971,207

[45] Date of Patent: Oct. 26, 1999

[54] NOZZLE APPARATUS AND METHOD FOR DISPENSING POWDER COATING MATERIAL

[75] Inventors: Charles M. McDonough, Stamford, Conn.; Gerald Chapins, Briarcliff Manor, N.Y.

[73] Assignee: PCF Group, Inc., Stamford, Conn.

[21] Appl. No.: 08/857,240

[22] Filed: May 16, 1997

[51] Int. Cl.[6] ..... G01F 11/00

[52] U.S. Cl. ..... 222/1; 222/82; 222/91; 222/105; 222/200; 222/399

[58] Field of Search ..... 222/81, 82, 83, 222/83.5, 89, 91, 105, 199, 200, 203, 399

[56] References Cited

U.S. PATENT DOCUMENTS

| | | | |
|---|---|---|---|
| 3,549,049 | 12/1970 | Weber | 222/91 |
| 4,826,500 | 5/1989 | Rautsola | 222/91 |
| 4,881,662 | 11/1989 | Tallman | 222/91 |
| 4,984,771 | 1/1991 | Ellis | 222/399 |
| 5,518,344 | 5/1996 | Miller et al. | 406/39 |
| 5,546,979 | 8/1996 | Clark, II et al. | 222/91 |

FOREIGN PATENT DOCUMENTS

| | | | |
|---|---|---|---|
| 675333 | 12/1963 | Canada | 222/91 |

OTHER PUBLICATIONS

"Fresh Pours" plastic spout for milk and juice cartons, Model 5624, Fox Run Craftsmen, Ivyland, Penn., 1993.

*Primary Examiner*—Joseph A. Kaufman
*Attorney, Agent, or Firm*—Barry R. Lipsitz; Ralph F. Hoppin

[57] ABSTRACT

A nozzle apparatus and method for dispensing powdered material from a container such as a cardboard shipping box. The apparatus has a shaft with a tip in the shape of a slant-cut cylinder which is manually inserted into the container through the container wall and an inner plastic lining of the container. A threaded portion on the shaft in the form of an increasing radius helix thread causes the apparatus to tighten against the wall of the container when the user manually rotates a gripping portion of the apparatus. A passageway extends from the tip to a fitting outside the container which can be connected to a vacuum source such as a powder pump to draw in the powder coating material. The fluidized powder is then carried to a spray gun for powder coating an object. A second passageway may be carried within the shaft and extend from an opening within the container to a fitting outside the container to carry a pressurized gas into the container. The container may be placed on a vibrating tilted platform to agitate the powder coating material.

19 Claims, 4 Drawing Sheets

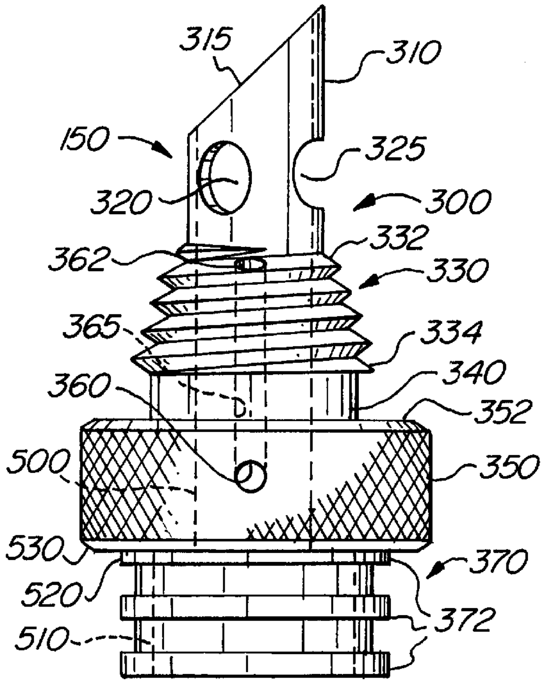
FIG. 3
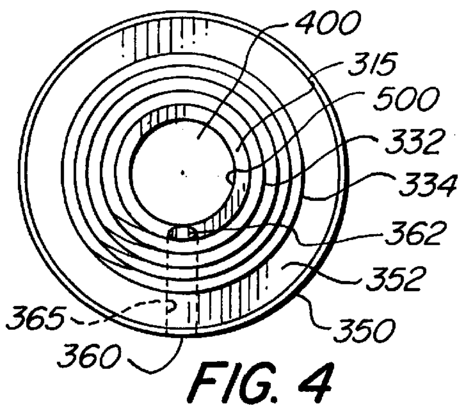
FIG. 4
FIG. 5
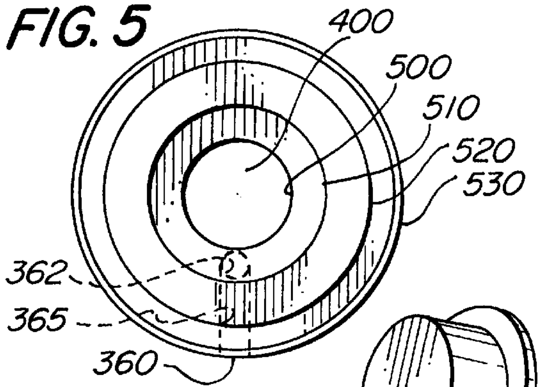
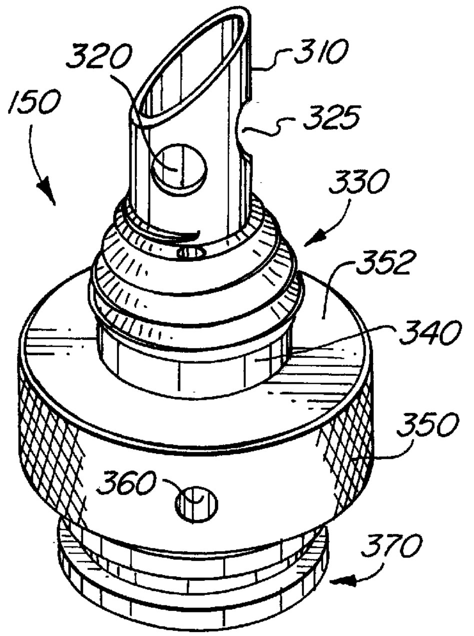
FIG. 6
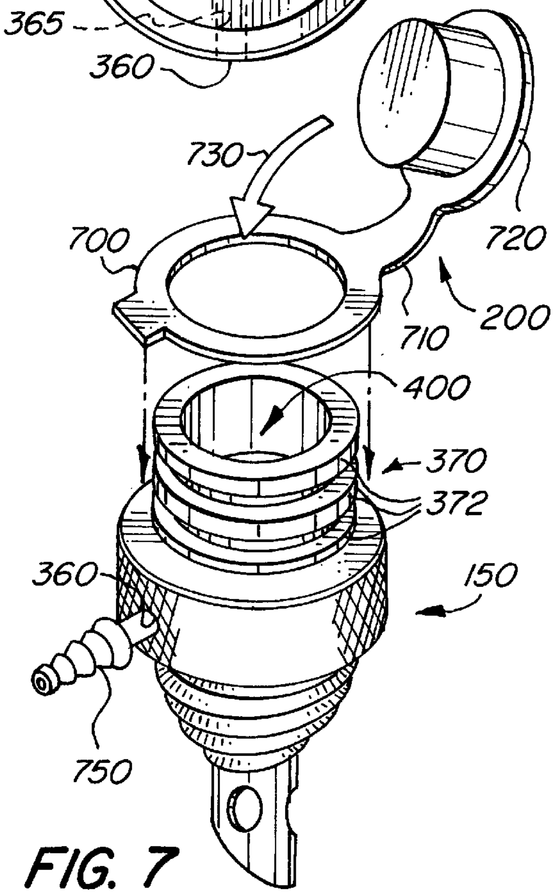
FIG. 7

NOZZLE APPARATUS AND METHOD FOR DISPENSING POWDER COATING MATERIAL

BACKGROUND OF THE INVENTION

The present invention relates to a nozzle apparatus and method for dispensing powder coating material from a container such as a cardboard shipping box.

Manufactured objects are commonly coated by spraying an electrically charged powder onto the object while the object is electrically grounded. Electrostatic attraction holds the powder on the object until heat is applied to flow the powder together and to cure it. An apparatus for electrostatic powder coating typically includes a powder coating material storage container, a container for holding and suspending powder in a fluid such as air, a jet pump for conveying fluidized powder, and a spray gun. Using additional fluid, the jet pump induces a stream of fluidized powder from the container and propels the fluidized powder through a hose leading to the spray gun. The powder particles are electrically charged via electrodes at the nozzle of the gun and sprayed onto the object to be coated.

However, various difficulties arise in dispensing the powder coating material from the storage container so that a steady, consistent flow of fluidized powder is supplied to the spray gun. Conventionally, the powder coating material is shipped to a powder coating facility in a plastic bag in a cardboard box. Each box may carry up to 300 pounds or more of powder coating material, for example, but a 45 pound box is more common. Alternatively, a metal shipping drum may be used. In either case, the powder coating facility operator would normally transfer the powder coating material from the shipping container to a large feed hopper, where it could then be pumped to the spray gun.

However, when it is desired to use different powder coating colors, it is necessary for the operator to either purchase a different hopper for each different color, or to transfer the powder coating material back to the shipping container or other temporary storage container so that the hopper can be used with a different color. However, this is unsatisfactory since it is expensive and inconvenient for the operator to purchase and store a number of separate hoppers. Additionally, the hopper must be thoroughly cleaned to prevent contamination when a different color is used.

Moreover, once the shipping container is opened, the powder coating material is subject to contamination from a variety of factors, including atmospheric conditions such as moisture, dirt from the facility, and lint or hair from the operator or his clothing. Additionally, various health risks may be posed to the operator with exposure to the powder coating material due to airborne epoxy, vinyl, polytetrafluorethylene (Teflon), acrylic, polyester, and/or urethane components, and other substances which may be released.

Accordingly, the desirability of dispensing the powder coating material directly from the shipping container has been acknowledged. For example, one system for dispensing powder coating material from a cardboard shipping box includes a long tube which is inserted into the shipping container and draws in the powder coating material from the bottom of the container. The container is further carried at an angle on a vibrating platform to agitate the material.

However, such a system is unsatisfactory because the tube must be disassembled and cleaned when it is desired to use a different color of powder coating material, thereby slowing the operator's progress. Additionally, the box and plastic liner must be opened to insert the tube, thereby subjecting the material to contamination as well as exposing the operator to the material. Moreover, the tube may be prone to clogging since a large amount of material may accumulate in the tube when the material is not being dispensed. Also, such tubes may have a double-walled design which can trap the material, thus leading to contamination when the tube is inserted in a another container with a different colored material. Furthermore, the tube may have a cap or other fluidizing parts which may fall off and get lost in the powder coating material. Gravity feed and fluid bed hoppers are also known, and have their own disadvantages Accordingly, it would be desirable to provide an apparatus for dispensing powder coating material from a shipping container which does not suffer from the above disadvantages. In particular, the apparatus should allow the material to be dispensed without opening the lid of the box, i.e., breaking the factory seal. The apparatus should further allow the operator to easily and quickly switch to different colors and/or containers of powder coating material without cleaning or disassembling the apparatus. The apparatus should further be inexpensive to manufacture, and should not have any parts which are subject to fall off while submerged in the powder coating material. The apparatus should dispense as much of the material from the container as possible to prevent waste, but should also allow the operator to seal the container for later reuse. The present invention provides a nozzle apparatus for dispensing powder coating material having the above and other advantages.

SUMMARY OF THE INVENTION

In accordance with the present invention, a nozzle apparatus and method for dispensing powder coating material from a container such as a cardboard shipping box are presented.

The nozzle apparatus includes a substantially hollow shaft which may be cylindrical. A tip portion of the shaft may have a slant-cut or similar pointed shape to allow the tip of the shaft to easily pierce a wall of the container. The shaft also has an increasing diameter threaded portion which engages the wall to secure the apparatus in the container when the apparatus is rotated. A grip portion such as a knurled wheel may be provided for this purpose to allow a user to easily grip and rotate the apparatus.

The apparatus has a first fitting which allows the apparatus to be connected to a powder pump (e.g., venturi pump) with a vacuum source. A first passageway extends within the apparatus from the tip portion, which may include one or more apertures, to the first fitting to allow the powder coating material in the container to be conveyed through the apparatus and into the powder pump. Finally, an air stream carrying the material is routed to a spray gun or the like for use in powder coating an object.

The apertures in the tip portion may be located circumferentially and up and down the length of the tip to allow the powder coating material to easily enter the passageway. Various sizes and shapes of apertures may be used.

Pressurized air or other gas may be introduced into the container to replace air that is drawn out to improve the flow of material through the nozzle. For this purpose, a second passageway may be routed through the shaft to expel the pressurized air or other gas near the tip in one or more outlets. The second passageway may extend through the grip, for example, to a second fitting at the outer diameter of the grip. A press-fit fitting may be used which receives a conduit through which the pressurized air or other gas is provided.

The first passageway may be sealed at the first fitting by a plug-in or twist-on cap or the like to seal the container so that it can be stored and used later. Or, a valve such as a ball valve or butterfly valve may be provided within the first passageway to releasably seal the first passageway. In either case, sealing the first passageway prevents contaminating matter from entering the container during storage, and prevents the material from spilling out.

The apparatus may have a spacing portion which is located between the threaded portion and the gripping portion. The height of the spacing portion may be about the same or slightly less than the thickness of the container wall. In this case, a lower portion of the threaded portion abuts the interior of the container, and a top portion of the gripping portion abuts the exterior of the container when the apparatus is secured in the container.

An apparatus for dispensing powdered material from a box container includes holding means such as a cradle which is adapted to hold the box container in a tilted position so that a particular corner region of the box container is lower than the remainder of the container. The nozzle may be inserted and secured in the lowermost region of the container to convey the powder coating material to a powder pump. The cradle may rest on a vibrating mechanism which vibrates the cradle to agitate the powder in the box container to promote a steady flow.

A method for dispensing a powdered material from a container includes the step of providing a nozzle having a shaft with a tip portion and a securing portion, and a first passageway extending through the nozzle. A wall of the container is punctured using the tip portion, and the tip portion is inserted into the container. The nozzle is positioned to cause the securing portion to engage the container to secure the nozzle in the container. The nozzle can be coupled to a conveying means, such as a vacuum pump, to cause the powdered material to be transported through the first passageway from the tip portion to the conveying means, and then to a spray gun, for example.

When the nozzle includes a gripping portion and the securing portion includes a threaded portion, the positioning step includes the step of rotating the gripping portion to cause the threaded portion to threadedly engage the container to secure the nozzle in the container.

When the nozzle includes a second passageway which is carried within the shaft and extends into the container when the nozzle is secured in the container, the method comprises the further step of coupling a pressurized gas source to the second passageway to cause pressurized gas to be transported into the container.

Finally, the container may be positioned in a holder such that a region of the container in which the nozzle is secured is a lowermost region of the container. That is, the container is held at a tilted orientation and the nozzle is inserted into the lower corner region of the container.

BRIEF DESCRIPTION OF THE DRAWINGS

FIG. 3 is side elevation view of a nozzle apparatus in accordance with the present invention.

FIG. 4 is top view of a nozzle apparatus in accordance with the present invention.

FIG. 5 is bottom view of a nozzle apparatus in accordance with the present invention.

FIG. 6 is perspective view of a nozzle apparatus in accordance with the present invention.

FIG. 7 is perspective view of a nozzle apparatus with a press-fit connector, and a tethered cap shown in an exploded view, in accordance with the present invention.

DETAILED DESCRIPTION OF THE INVENTION

A nozzle apparatus for dispensing powder coating material from a container such as a cardboard shipping box is presented.

Figure 1:
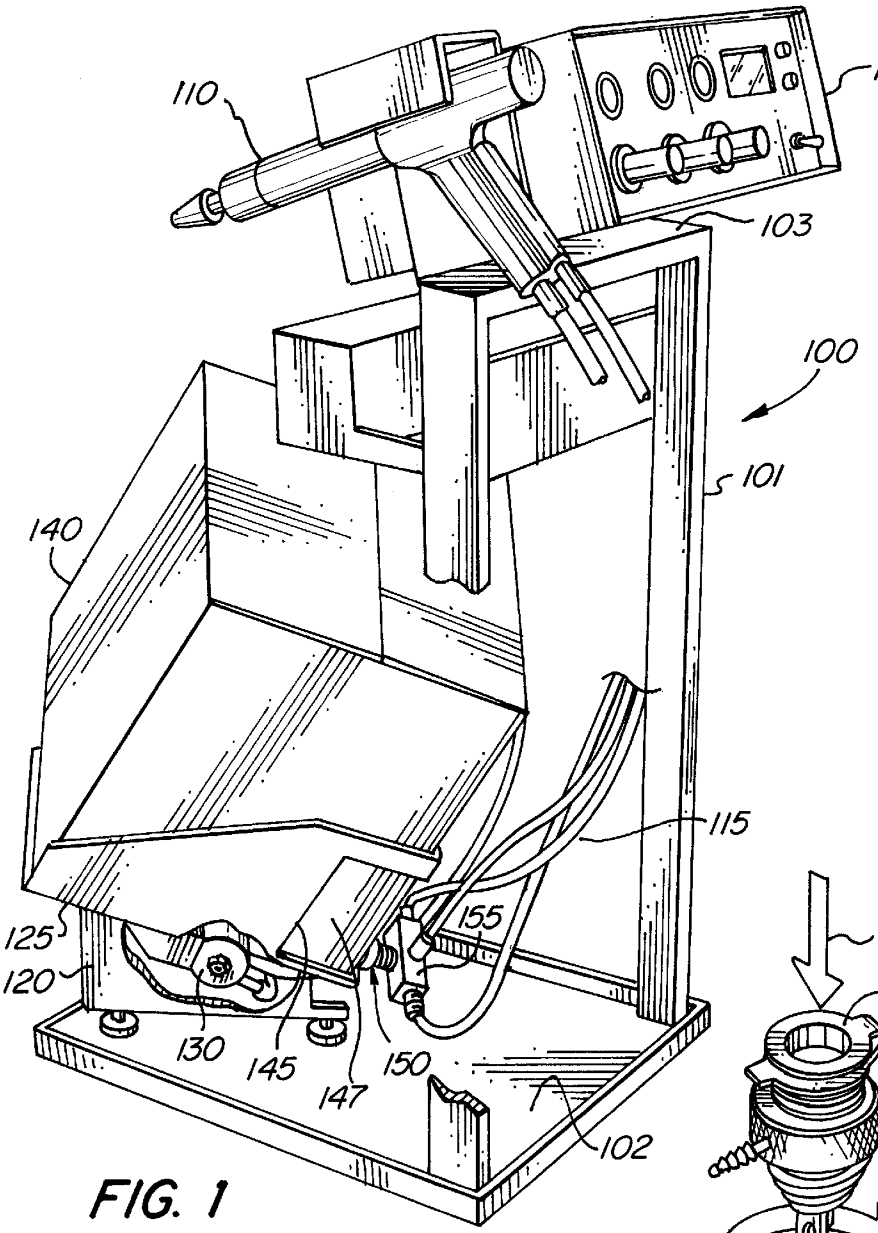
FIG. 1 is perspective view of a stand for holding a container of powder coating material, with parts broken away to show interior details in accordance with the present invention.

FIG. 1 is perspective view of a stand for holding a container of powder coating material in accordance with the present invention. A supporting structure, shown generally at 100, includes a base 102, a vertical frame 101, and a top support 103. A control box 105 and an electrostatic spray gun 110 are carried by the top support 103. A container support 120 which includes a cradle 125 and a vibrating mechanism 130 rests on the base 102. A powder coating material container such as a cardboard box 140 rests in the cradle 125 at a tilted orientation. The powder coating material is typically stored in a plastic bag in the container. The cradle 125 includes a cut-out region 145 which exposes the lowermost corner portion 147 of the container 140.

A nozzle apparatus 150 in accordance with the present invention is secured to the lowermost corner portion 147 of the container 140 and to a powder pump 155, as will be discussed below in greater detail. Various hoses, shown generally at 115, provide a pressurized gas such as air to the pump 155 to create a vacuum which draws the powder coating material from the container and to the spray gun. The powder coating material is also assisted by gravity into the pump 155. It will be appreciated that, by tilting the container 140 and by positioning the nozzle 150 at the lowermost portion 147 of the container, virtually all of the material in the container may be dispensed since the amount of material remaining in the container is minimized. However, tilting of the container is not required to use the nozzle.

Figure 2:
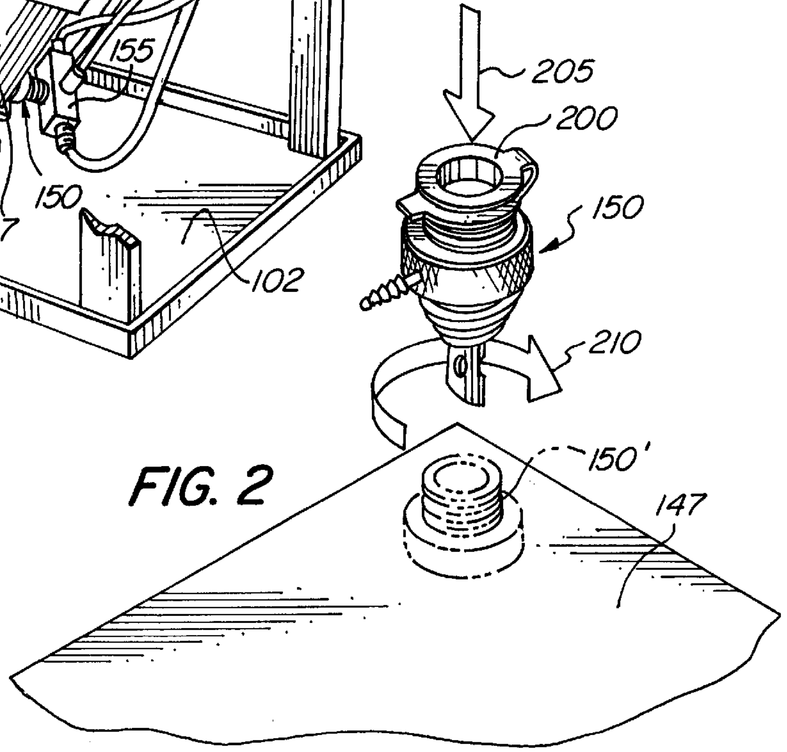
FIG. 2 is perspective view of a nozzle apparatus which is positioned for insertion into a powder coating material container in accordance with the present invention.

FIG. 2 is perspective view of a nozzle apparatus which is positioned for insertion into a powder coating material container in accordance with the present invention. The nozzle 150 is shown with a tethered cap 200 which allows the end of the nozzle to be sealed. As shown by the arrow 205, the nozzle can be manually pushed directly through the wall of the lowermost portion 147 of the container 140. Then, as shown by arrow 210, the nozzle can be rotated to cause a threaded portion of the nozzle to secure the nozzle in the container. The nozzle is rotated clockwise when viewed from above to secure the nozzle in the container in this example when the threaded portion has a right-hand thread.

As will become apparent to those skilled in the art, other fastening mechanisms besides a threaded portion may be used. For example, the nozzle may be fashioned with barbs which prevent the nozzle from being withdrawn after it is inserted into the container. Or the nozzle may be fashioned as a tap with a conical region with a bottom surface which engages the interior container wall to prevent the nozzle from being withdrawn when the nozzle is hammered into the container.

A phantom image of the nozzle 150' shows the end of the nozzle when the nozzle is fully secured against the wall of the lowermost portion 147 of the container 140. Preferably, the user inserts the nozzle 150 into the lowermost portion 147 of the container 140 when the container is on a table or on the floor. The weight of the material causes the inner plastic lining to be compacted against the inner surface of the container so that the nozzle will cleanly puncture the container wall and the inner plastic lining. Once the nozzle is secured in the container, the container may be placed in the cradle 125, and the powder pump 155 may be secured to the nozzle. Optionally, instead of using a cap such as the tethered cap 200, the nozzle may be provided with a butterfly valve, ball valve or the like. In either case, the cap or valve can be used to prevent spillage prior to securing the powder pump to the nozzle, after removing the powder pump from the nozzle, and during storage of the container. Contamination of the material is also precluded when the cap or valve is closed.

As discussed below, the nozzle tip may comprise a slant-cut hollow cylinder to facilitate the puncturing of the container wall and the inner lining, and subsequent dispensing of the powder material. The nozzle may be constructed from a metal such as aluminum, or other rigid material such as plastic.

Once the nozzle is secured in the container, it may remain with the container until the container is empty. Each container will have its own nozzle. Thus, there is no need to clean or replace the nozzle with each use, since there is no concern with color contamination between boxes.

FIG. 3 is profile view of a nozzle apparatus in accordance with the present invention. The nozzle 150 includes a hollow shaft 300 which has a tip portion 310, a threaded portion 330, a container wall spacing portion 340, a gripping portion 350, and a first fitting 370. The shaft 300 may be generally cylindrical, in which case the tip portion 310 may include a slant-cut 315 at its extreme end to facilitate the puncturing of the container. The slant-cut may further have a beveled surface which is honed to a desired sharpness. A slant-cut is not required, however, and other configurations may be used. For example, the tip portion may include a conical or triangular profile.

The tip portion 310 may optionally include one or more openings (e.g., apertures) such as apertures 320 and 325. The powder coating material is drawn into a passageway defined by interior walls 500 and 510 of the nozzle via the open end at slant-cut 315 and, when provided, via apertures 320 and 325. It is advantageous to provide a number of apertures which extend circumferentially, and/or longitudinally up and down the tip portion 310. The apertures need not be circular, but may have various other configurations, including slots or the like.

The threaded portion 330 includes a helical thread and has a diameter which decreases in the direction of the tip. To facilitate the insertion of the nozzle into the container wall, the diameter of the threaded portion is approximately the same as the width of the tip portion at its uppermost part 332, but increases gradually toward its lowermost point 334. Moreover, the lowermost point 334 of the threaded portion 330 acts as a flange to secure the nozzle in the container. Specifically, the lowermost point 334 of the threaded portion 330 may abut the interior wall of the container, while a top surface 352 of the gripping portion 350 may abut the exterior wall of the container, thereby holding the nozzle securely in place.

The wall spacing portion 340 is sized to separate the lowermost portion 334 of the threaded portion 330 and the top surface 352 of the gripping portion 350. Generally, for the nozzle to be held in place securely, it is desirable to size the height of the wall spacing portion to be about the same, or slightly less than, the thickness of the container wall.

The gripping portion 350 can be manually gripped by the operator's hand to rotate the nozzle. When the nozzle 150 is rotated, the threaded portion 330 engages the container wall and causes the nozzle to be seated in the container. The gripping portion may be cylindrical with a knurled surface at the outer diameter 530 to prevent slipping. Alternatively, or in addition, the gripping surface may be hexagonal so that it can be gripped by a wrench, or lever arms or the like may protrude from the gripping portion 350 to assist the operator.

Generally, the torque required to seat the nozzle in the container will depend on the container material and thickness, the pitch of the thread of the threaded portion, the relative amount of increase in the diameter of the threaded portion, and the diameter of the gripping portion. The nozzle of the present invention can therefore be adapted for various applications as required. The inventors have found that a nozzle with approximately five turns of the thread, with a thread spacing of approximately 2–3 mm, and a thread height (measured radially) of approximately 1.5 mm, is suitable for most applications. Moreover, the tip portion 310 may have an outer diameter of 15 mm and a thickness of 1 mm, for example. The outer diameter of the gripping portion may be 35–40 mm or greater.

The gripping portion 350 has an inlet 360 which is adapted to receive a press-fit conduit through which pressurized gas (e.g., air) may be introduced. The inlet 360 extends to an outlet 362 via a passageway 365 which is carried by the shaft 300. In a process known as aeration, the pressurized air replaces air which is carried out of the container through a passageway which extends through the nozzle from the tip portion 310 to the fitting 370, as discussed below. The pressurized air may also create a flow field which enhances the movement of the powder coating material through the apertures. The use of such pressurized air is not required, and the provision of inlet 360, passageway 365 and outlet 362 are optional.

It will be appreciated that the configuration shown with the inlet 360, passageway 365, and outlet 362 is an example, and other configurations may be used. For example, more than one inlet and/or outlet may be used with a common passageway. Or, separate passageways may be used. Furthermore, the location of the inlet(s) or outlet(s) may vary. For example, an outlet may be provided in the threaded portion 330 of the nozzle 150. The threaded portion or other deflection or guiding surface may be used to direct the expelled air to create a desired effect.

The powder coating material which is dispensed from the container via the passageway defined by walls 500 and 510 passes through the fitting 370 and into a powder pump. The fitting 370 may therefore be adapted to facilitate coupling of the nozzle and the powder pump. For example, the fitting 370 may have a plurality of ribs 372 with an outer diameter 520 which facilitate coupling to a particular model of powder pumps which are presently used in the industry. The ribs 372 are not required, however, and any suitable configuration may be used. Alternatively, the powder pump may be of a type that is inserted into the passageway defined by wall 510, as described in greater detail below in connection with FIG. 9.

FIG. 4 is top view of a nozzle apparatus in accordance with the present invention. A passageway 400 extends the length of the nozzle to convey the powder coating material out of the container. Powder coating material is drawn into the passageway 400 from its open end and, when provided, from the apertures 320 and 325. The optional passageway 365 for conveying pressurized air to the container extends from the inlet 360 radially toward the center of the nozzle, and then turns at a right angle and extends toward the outlet 362. Thus, the pressurization passageway 365 is carried within the shaft 300 of the nozzle, at least in part.

FIG. 5 is bottom view of a nozzle apparatus in accordance with the present invention. The optional inlet 360, pressurization passageway 365, and outlet 362 are shown. Additionally, the material-conveying passageway 400, passageway walls 500 and 510, rib outer diameter 520, and gripping portion outer diameter 530 are shown.

FIG. 6 is perspective view of a nozzle apparatus in accordance with the present invention. Like-numbered elements correspond to the elements in FIGS. 3–5.

FIG. 7 is perspective view of a nozzle apparatus with a press-fit connector 750 and a tethered cap 200 in accordance with the present invention. Generally, once the nozzle 150 is inserted into a container, it may be left there until the contents of the container are completely consumed. Once the contents are consumed, the nozzle can be removed and the container can be discarded. In accordance with the present invention, the powder coating material may be dispensed intermittently, and stored until reuse is desired. It is therefore desirable to seal the nozzle to prevent the powder coating material from leaking out and to prevent contamination due to environmental factors and the like.

One option in accordance with the present invention is to provide a tethered cap, shown generally at 200, which can be easily operated to seal and unseal the nozzle. The cap 200 may include a ring 700 which is placed over the fitting 370 and ribs 372, together with a tether 710, and a stopper 720. Once the ring is installed on the fitting 370, the stopper can be positioned as shown by the arrow 730 to seal the nozzle passageway 400. The tethered cap 200 may be produced from synthetic rubber, plastic or the like. The tether 710 may be a chain or cable or the like which is affixed to the nozzle via a screw, in which case the ring 700 is not required. Or, the stopper 720 may be untethered. Other sealing means will become apparent to those skilled in the art, such as a screw-on or clamp-on lid. Alternatively, or in addition, a ball valve, butterfly valve or the like can be provided as discussed in connection with FIG. 8.

The nozzle 150 is shown with a conduit 750 which may press-fit into the inlet 360 of the pressurization passageway 365 to supply pressurized gas to the container. The conduit may be permanently or removeably (e.g., threadedly) seated in the inlet 360. Of course, the conduit 750 is not required and any available means may be used to supply pressurized gas to the inlet 360.

Figure 8:
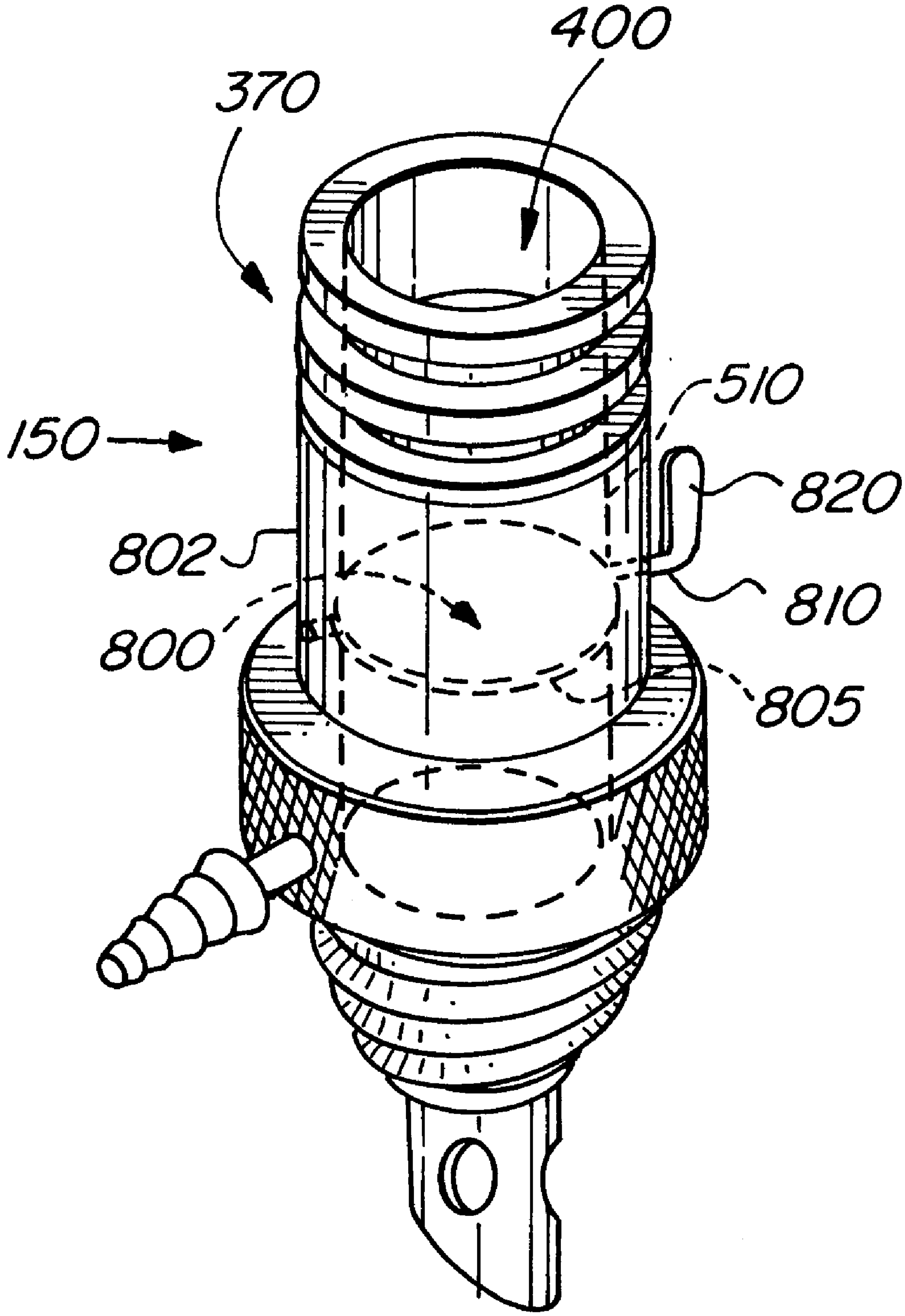
FIG. 8 is perspective view of a nozzle apparatus with a butterfly valve in accordance with the present invention.

FIG. 8 is perspective view of a nozzle apparatus with a butterfly valve in accordance with the present invention. Like-numbered elements correspond to the elements in FIGS. 3–7. The passageway 400 and passageway wall 510 are shown. The height of a region 802 of the nozzle is increased to accommodate a valve, shown generally at 800, so that the use of the fitting 370 is not hampered. The valve 800 includes a sealing plate 805, which is carried by a shaft 810 that connects to a control arm 820. The use of such a valve is known generally to those skilled in the art and therefore will not be described in greater detail. Other valves, such as gate valves or ball valves, may also be used. The passageway wall 510 may need to be shaped according to the type of valve used. For example, with a ball valve, the passageway wall 510 should conform to the spherical profile of the valve.

Advantageously, the use of a valve such as the butterfly valve 800 allows the operator to connect the powder pump to the nozzle while the container is positioned in the cradle without having the powder coating material spill out due to gravity. Once the nozzle is secured to the powder pump, the valve may be opened to begin dispensing the powder coating material.

Figure 9:
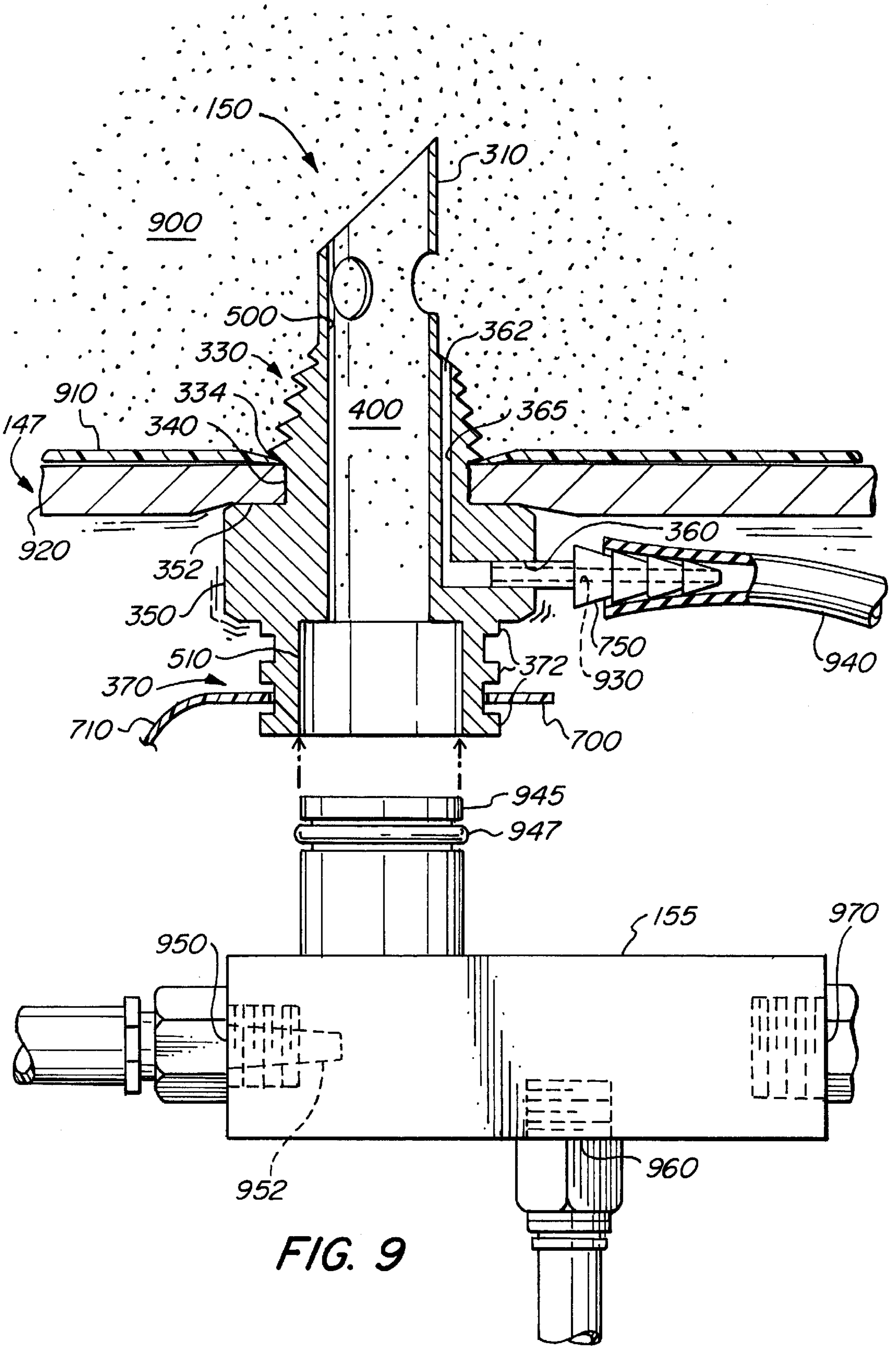
FIG. 9 is cross-sectional view of a nozzle apparatus secured to a wall of a powder coating material container and a powder pump in accordance with the present invention.

FIG. 9 is profile view of a nozzle apparatus secured to a wall of a powder coating material container and a powder pump in accordance with the present invention. Like-numbered elements correspond to the elements in FIGS. 3–8. The nozzle 150 is inserted into the lowermost portion 147 of the container through the container wall 920 and a lining 910 such as that of a plastic bag in which the powder coating material 900 is stored. The tip portion 310 of the nozzle is first used to puncture the container wall 920 and lining 910. The nozzle is then manually rotated using the grip portion 350 to cause the threaded portion 330 to engage the container wall 920 and lining 910, thus securing the nozzle in the container.

The nozzle may be seated in the container wall 920 when the lowermost point 334 of the threaded portion 330 abuts an interior surface of the container, which is the container wall 920 and/or the lining 910. At the same time, the top surface 352 of the gripping portion 350 may abut an exterior surface of the container (i.e., the container wall 920).

The press-fit conduit 750 is shown installed in the pressurization gas inlet 360. The conduit has an inner channel 930 through which gas supplied by a line 940 can travel. The line 940 may engage the conduit 750 in a friction fit.

A powder pump 155 includes a first inlet port 950 through which pressurized dosing air (e.g., main air) is supplied. The dosing air passes through a venturi, generally designated 952, to create a low pressure region at the exit of the venturi as well known in the art. Pressurized conveying air (e.g., supplemental air) is supplied via an inlet port 960. An upright portion 945 of the powder pump 155 with an O-ring 947 removeably engages the passageway wall 510 of the fitting 370 of the nozzle in an airtight manner so that the vacuum at the exit of the venturi 952 will draw the powder coating material through the passageway 500 and into the powder pump 155. Note that the external ribs 372 of the fitting 370 are not used in the particular embodiment of powder pump which is shown. However, other types of powder pumps which are commonly used may have a coupling which engages the external ribs 372 of the fitting 370.

In the powder pump 155, the dosing air, conveying air, and powder coating material combine to form a stream in which the powder coating material is carried. As well known in the art, the dosing air passing through the venturi 952 in the powder pump 155 draws a vacuum. This vacuum is used in accordance with the present invention to pull the powdered material from the vibrating container for input to a spray gun via a powder hose. The airborne powder coating material is conveyed through and exits the powder pump 155 through an exit port 970. The dosing air may be provided at a pressure of approximately 1 to 70 psi, while the conveying air is provided at a pressure of approximately 1 to 30, although these parameters can be varied as necessary.

It should now be appreciated that the present invention provides a convenient nozzle apparatus and method which allow an operator to dispense powder coating material directly from the shipping container in which it is received. The nozzle remains with the container once it is installed so there is no need to disassemble or clean the nozzle when it is desired to switch colors. The nozzle is resealable to allow the container to be stored and used intermittently. Additionally, the nozzle is adapted to be used in a vibrating cradle apparatus to minimize waste by extracting as much of the material from the container as possible. The nozzle can be manufactured inexpensively and easily installed manually in a matter of seconds. The apparatus allows the operator to work more efficiently, and with reduced waste, thereby offering the opportunity for improved profits.

Although the invention has been described in connection with various specific embodiments, those skilled in the art will appreciate that numerous adaptations and modifications may be made thereto without departing from the spirit and scope of the invention as set forth in the claims. For example, while a threaded portion is preferably used to allow the nozzle to be secured in the container by rotating the nozzle, other mechanisms may be employed. For example, the nozzle may be fashioned as a tap with barbs, e.g., jagged edges which prevent the nozzle from being withdrawn after it is inserted into the container. A hammer may be used to force the tap into the container.

What is claimed is:

1. A nozzle apparatus for dispensing powdered material from a container, comprising:

a shaft having a tip portion and a securing portion;

a first fitting; and a first passageway extending from said tip portion to said first fitting; wherein:

said tip portion is adapted to puncture a wall of the container and extend into the container;

said apparatus is adapted to be positioned to cause said securing portion to engage said container to secure said apparatus therein; and said first fitting is adapted to be coupled to a conveying means to cause said powdered material to be transported through said first passageway from said tip portion to said first fitting;

a second passageway which is carried within said shaft, at least in part, and extends into said container, at least in part, when said apparatus is secured in said container; and a second fitting which is fluidly coupled to said second passageway, and which is adapted to be coupled to a pressurized gas source to cause a pressurized gas to be transported into said container via said second passageway.

2. The apparatus of claim 1, wherein:

said tip portion comprises a plurality of apertures for conveying the powdered material to said first fitting via said first passageway.

3. The apparatus of claim 1, wherein:

said tip portion is adapted to puncture a wall of the container and at least one lining of said container, and extend into the container.

4. The apparatus of claim 1, further comprising:

releasable sealing means for releasably sealing said first passageway.

5. The apparatus of claim 1, further comprising:

a valve provided within said first passageway for releasably sealing said first passageway.

6. The apparatus of claim 1, further comprising:

a gripping portion;

said securing portion comprising a threaded portion; wherein:

said gripping portion is adapted to allow said apparatus to be rotated to cause said threaded portion to threadedly engage said container to secure said apparatus therein.

7. The apparatus of claim 6, further comprising:

a spacing portion disposed between said threaded portion and said gripping portion which corresponds to a thickness of a wall of said container in which said apparatus is secured.

8. The apparatus of claim 6, wherein:

said gripping portion comprises a top surface which is adapted to abut an exterior surface of said container to secure said apparatus in said container.

9. The apparatus of claim 6, wherein:

said gripping portion is carried on said apparatus at a position which is intermediate to said first fitting and said threaded portion.

10. The apparatus of claim 1, wherein:

said second passageway includes an outlet which is disposed proximate to said tip portion for expelling said pressurized gas into said container.

11. The apparatus of claim 1, wherein:

said powdered material comprises powder coating material.

12. A method for dispensing powdered material from a container, comprising the steps of:

providing a nozzle having a shaft with a tip portion and a securing portion, and a first passageway extending through said nozzle;

puncturing a wall of said container using said tip portion;

inserting said tip portion into said container, at least in part;

positioning said nozzle to cause said securing portion to engage said container to secure said nozzle therein; and coupling said nozzle to a conveying means; and transporting said powdered material through said first passageway from said tip portion to said conveying means.

13. The method of claim 12, wherein said nozzle includes a gripping portion and said securing portion includes a threaded portion, said positioning step comprising the step of:

rotating said gripping portion to cause said threaded portion to threadedly engage said container to secure said nozzle therein.

14. The method of claim 12, wherein said nozzle includes a second passageway which is carried within said shaft, at least in part, and extends into said container, at least in part, when said nozzle is secured in said container, said method comprising the further step of:

coupling a pressurized gas source to said second passageway to cause pressurized gas to be transported into said container.

15. The method of claim 12, comprising the further steps of:

positioning said container in a holder such that a region of said container in which said nozzle is secured is a lowermost region of said container.

16. The method of claim 17, wherein:

said powdered material comprises powder coating material.

17. A nozzle for dispensing powdered material from a container, comprising:

a shaft having a tip portion and a securing portion;

a first fitting;

a first passageway extending from said tip portion to said first fitting; and a gripping portion;

said tip portion being adapted to puncture a wall of the container and extend into the container;

said nozzle being adapted to be positioned to cause said securing portion to engage said container to secure the nozzle therein;

said first fitting being adapted to be coupled to a conveying means to cause said powdered material to be transported through said first passageway from said tip portion to said first fitting;

said securing portion comprises a threaded portion;

said gripping portion is adapted to allow the nozzle to be rotated to cause said threaded portion to threadedly engage said container to secure the nozzle therein; and said threaded portion has a diameter which increases from a first portion which is proximate to said tip portion to a second portion which is distal from said tip portion, to facilitate the securing of the nozzle in said container.

18. The apparatus of claim 17, wherein:

said lowermost portion is adapted to abut an interior surface of said container to secure said apparatus in said container.

19. A method for dispensing powdered material from a container, comprising the steps of:

providing a nozzle having a shaft with a tip portion and a securing portion, and a first passageway extending through said nozzle;

puncturing a wall of said container using said tip portion;

inserting said tip portion into said container, at least in part; and positioning said nozzle to cause said securing portion to engage said container to secure said nozzle therein; wherein:

said nozzle is adapted to be coupled to a conveying means to cause said powdered material to be transported through said first passageway from said tip portion to said conveying means; and said nozzle includes a second passageway which is carried within said shaft, at least in part, and extends into said container, at least in part, when said nozzle is secured in said container, said method comprising the further step of:

coupling a pressurized gas source to said second passageway to cause pressurized gas to be transported into said container.

* * * * *